(12) United States Patent
Ericksen et al.

(10) Patent No.: US 12,384,213 B2
(45) Date of Patent: Aug. 12, 2025

(54) HOT-START SUSPENSION TUNE

(71) Applicant: Fox Factory, Inc., Duluth, GA (US)

(72) Inventors: Everet Owen Ericksen, Woodland, CA (US); Evan Peterson, Santa Cruz, CA (US); Evan Power, Burnaby (CA); Michael Fraguglia, Meadow Vista, CA (US); Zachary Michaels, Vancouver (CA); Jordi Cortes, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/814,353

(22) Filed: Aug. 23, 2024

(65) Prior Publication Data

US 2025/0083487 A1    Mar. 13, 2025

Related U.S. Application Data

(60) Provisional application No. 63/534,717, filed on Aug. 25, 2023.

(51) Int. Cl.
*B60G 17/016* (2006.01)
*B60G 17/019* (2006.01)

(52) U.S. Cl.
CPC ......... *B60G 17/016* (2013.01); *B60G 17/019* (2013.01)

(58) Field of Classification Search
CPC .... B60G 17/016; B60G 17/019; B62K 25/00; B62J 50/22
See application file for complete search history.

(56) References Cited

U.S. PATENT DOCUMENTS

| | | |
|---|---|---|
| 4,773,671 A | 9/1988 | Inagaki |
| 4,984,819 A | 1/1991 | Kakizaki et al. |
| 5,027,303 A | 6/1991 | Witte |
| 5,105,918 A | 4/1992 | Hagiwara et al. |
| 5,390,949 A | 2/1995 | Naganathan et al. |
| 6,244,398 B1 | 6/2001 | Girvin et al. |
| 6,427,812 B2 | 8/2002 | Crawley et al. |
| 6,863,291 B2 | 3/2005 | Miyoshi |
| 6,935,157 B2 | 8/2005 | Miller |
| 7,374,028 B2 | 5/2008 | Fox |
| 8,838,335 B2 | 9/2014 | Bass et al. |
| 9,353,818 B2 | 5/2016 | Marking |
| 9,623,716 B2 | 4/2017 | Cox |
| 9,682,604 B2 | 6/2017 | Cox et al. |
| 9,797,467 B2 | 10/2017 | Wootten et al. |
| 10,036,443 B2 | 7/2018 | Galasso et al. |
| 10,415,662 B2 | 9/2019 | Marking |
| 11,459,050 B2 | 10/2022 | Allinger et al. |
| 11,521,117 B2 * | 12/2022 | Shimazu ................. B62J 45/20 |
| 2001/0030408 A1 * | 10/2001 | Miyoshi ................. B62K 25/28 267/141 |
| 2015/0061241 A1 * | 3/2015 | Walthert ................. B62K 23/02 701/37 |
| 2018/0037294 A1 * | 2/2018 | Kurotobi ................. B62K 25/04 |
| 2020/0247498 A1 * | 8/2020 | Yamamoto ............. B62J 45/412 |
| 2021/0179227 A1 * | 6/2021 | Sintorn ................. B62K 25/04 |
| 2023/0081873 A1 * | 3/2023 | Ericksen ............. B60G 17/019 280/5.515 |

\* cited by examiner

*Primary Examiner* — Toan C To

(57) ABSTRACT

A hot-start suspension tune system and method is disclosed. The method initiates a starting suspension tune for a vehicle. The starting suspension tune is maintained until a predefined threshold is reached. After the predefined threshold is reached, the starting suspension setting is automatically modified to a performance suspension setting.

20 Claims, 6 Drawing Sheets

HOT-START SUSPENSION TUNE

CROSS REFERENCE TO RELATED APPLICATIONS (PROVISIONAL)

This Application claims priority to and benefit of U.S. Provisional Patent Application No. 63/534,717 filed on Aug. 25, 2023, entitled "Hot-Start Algorithm For Active Valve" by Ericksen et al., and assigned to the assignee of the present application, the disclosure of which is hereby incorporated by reference in its entirety.

FIELD OF THE INVENTION

Embodiments of the invention generally relate to an electronically adjustable shock assembly.

BACKGROUND OF THE INVENTION

During a competition, the difference between winning and placing can come down to seconds or even fractions of seconds. As such, the importance of a good start cannot be overstated. However, the suspension settings that provide the best starting performance are not usually the same as the suspension settings that provide the best event performance. Thus, a great start will be quickly overshadowed if the vehicle underperforms during any of the remainder of the event. For example, while a vehicle having a suspension set up for starting would provide better start performance, that same suspension setup will quickly result in a degraded level of performance after the vehicle enters the performance sections of the event. Thus, even a very short amount of time spent in the performance section on a vehicle with its suspension set to a starting tune can incur time losses that will affect the overall result.

Figure 1:
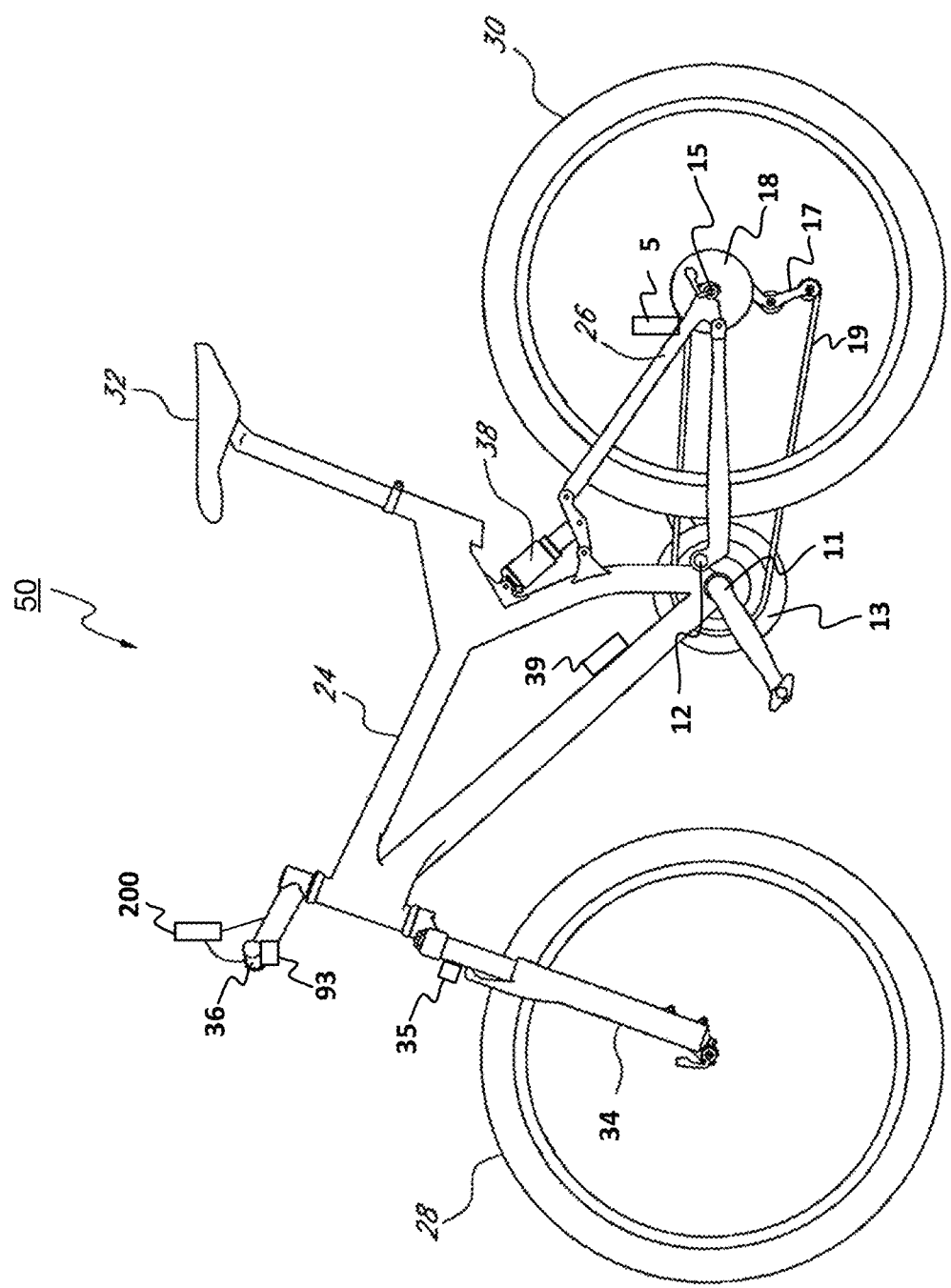
FIG. 1 is a line diagram side view of a bicycle, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

The term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension").

In a conventional "fully active suspension", a motive source such as, for example, an actuator, is used to move (e.g. raise or lower) a wheel with respect to the vehicle. In a "semi-active suspension", no motive force/actuator is employed to move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to move (e.g. raise or lower) a wheel with respect to the vehicle. As such, it will be understood that an "active valve", as defined above, is well suited for use in a "fully active suspension" or a "semi-active suspension".

The term "lockout" is used herein to refer to the most restricted flow state attainable or desirable. Thus, in one embodiment, lockout refers to a stoppage of all fluid flow through a given fluid path. However, in another embodiment, lockout does not stop all the fluid flow through a given fluid path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the adjustable shock assembly has been reduced to a minimum size for a given adjustable shock assembly, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

The term "tune" is used herein to encapsulate one or a group of settings that have been optimized for a particular feel or set of riding conditions. It may include vehicle setup information such as suspension settings (e.g., a suspension tune), engine performance settings (e.g., an engine tune), and the like.

For example, in one embodiment, a performance tune will include specific compression and rebound characteristics for one or more vehicle shock assemblies. In another example, a closed tune will adjust one or more vehicle shock assemblies to be in a firm compression setting (e.g., firmest, locked-out, etc.).

In many events, the ideal starting suspension settings are not the same as the preferred suspension settings for the rest of the event. For example, at the start of an event the rider will start from a standstill (or rolling start) and will generate an initial burst of acceleration for the first few meters. In other words, the rider will basically be the dominant force in the rider-vehicle equation. However, after the initial burst of acceleration, there will be a transition to the event performance portion. At that point, the rider-vehicle equation will change to a symbiotic relationship as the rider works in conjunction with the vehicle suspension to achieve the best performance.

In addition, the first few meters of an event are often formatted as a starting section and will include technically simple features such as a starting gate, platform, slope, and/or an initial straightaway. This starting section will allow the rider to focus on attaining the needed acceleration with minimal outside interference. After completing the starting section, the rider will begin the performance aspects of the event where the rider will quickly transition from a pure acceleration mode to a performance mode.

Hot-start places the bike in the most appropriate suspension setting for the start of the race. After the start, the hot-start will automatically transition the vehicle from the starting suspension setting to an appropriate performance suspension setting.

With reference now to FIG. 1, a schematic side view of a bicycle 50 is utilized as the example vehicle having one or more suspension components thereon. However the vehicle may another type of vehicle and/or a component of a vehicle, prosthetic apparatus, or the like. Thus, where the discussion is directed toward tunes, settings, and the like, it should be appreciated that those discussions would be applicable to any other vehicle having the same or similar components. For example, the shock assembly of a bicycle is used in the suspension discussion. However, the shock assembly of a motorized bicycle, a motorcycle, a watercraft (e.g., boat, jet ski, PWC, etc.), a snow machine, a single wheeled vehicle, a multi-wheeled vehicle, a side-by-side, an on- and/or off-road vehicle, prosthetic, or the like that has one or more electronically adjustable features would also have similar applicability.

In general, a motorized bike can include a bike with a combustion motor, an electric bike (e-bike) with an electric motor, a hybrid electric and combustion bike, a hybrid motor and pedal powered bike, and the like.

Bicycle 50 has a frame 24 with a suspension system comprising a swing arm 26 that, in use, is able to move relative to the rest of frame 24; this movement is permitted by, inter alia, shock assembly 38. The front forks 34 also provide a suspension function via a shock assembly in at least one fork leg; as such the bicycle 50 is a full suspension bicycle (such as an ATB or mountain bike). However, the embodiments described herein are not limited to use on full suspension bicycles. Instead, the following discussion is intended to include vehicles having front suspension only, rear suspension only, seat suspension only, other components with a shock assembly of some type, a combination of two or more different suspensions, and the like.

In one embodiment, swing arm 26 is pivotally attached to the frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the location of pivot point 12 herein is provided as one embodiment of the location. Bottom bracket axis 11 is the center of the pedal and front sprocket assembly 13. Bicycle 50 includes a front wheel 28 which is coupled to the frame 24 via front fork 34 and a rear wheel 30 which is coupled to the frame 24 via swing arm 26. A seat 32 is connected to the frame 24 (in one embodiment via a seatpost) in order to support a rider of the bicycle 50.

The front wheel 28 is supported by a front fork 34 which, in turn, is secured to the frame 24 by a handlebar assembly 36. The rear wheel 30 is connected to the swing arm 26 at rear axle 15. Shock assembly 38 is positioned between the swing arm 26 and the frame 24 to provide resistance to the pivoting motion of the swing arm 26 about pivot point 12. Thus, the illustrated bicycle 50 includes a suspension member between swing arm 26 and the frame 24 which operate to substantially reduce rear wheel 30 impact forces from being transmitted to the rider of the bicycle 50.

Bicycle 50 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Chain tension device 17 provides a variable amount of tension on chain 19.

In one embodiment, bicycle 50 includes one or more sensors, connected components, or the like for sensing changes of terrain, bicycle 50 pitch, roll, yaw, speed, acceleration, deceleration, or the like. For example, in one embodiment, a sensor 5 is positioned proximate the rear axle 15 of bicycle 50. In another embodiment, a sensor 35 is positioned proximate to front fork 34. In yet another embodiment, both sensor 5 and sensor 35 are on bicycle 50.

In one embodiment, the angular orientation of the one or more sensors is movable through a given range, thereby allowing alteration of a force component sensed by the sensor in relation to a force (vector) input. In one embodiment, the value for the range is approximately 120°. In one embodiment, the value for the range is approximately 100°. It is understood that the sensor can be moved or mounted in any suitable configuration and allowing for any suitable range of adjustment as may be desirable. That is useful for adjusting the sensitivity of the sensor to various anticipated terrain and bicycle speed conditions (e.g., the bicycle speed affects the vector magnitude of a force input to the bicycle wheel for constant amplitude terrain disparity or "bump/dip." Varying size bumps and dips also affect the vector input angle to the wheel for constant bicycle speed).

In one embodiment, bicycle 50 includes a switch 93. In general, switch 93 is a positional switch used in conjunction with the active valve suspension discussed in further detail herein. In one embodiment, switch 93 is a multi-positional switch, an upshift/downshift type of switch, a button type switch, or the like. For example, switch 93 would be a 2-position switch, a 3-position switch, a switch that can cycle through a number of different active valve suspension tunes, or the like.

In one embodiment, switch 93 is wireless. For example, switch 93 would communicate with the mobile device 200, controller 39, and/or other components via Bluetooth, NFC, WiFi, a hotspot, a cellular network, or any other type of wireless communications.

In one embodiment, switch 93 could be wired and could communicate with mobile device 200 by way of an input port such as USB, micro USB, or any other connectable wired configuration that will allow switch 93 to be communicatively coupled with mobile device 200. In one embodiment, switch 93 could have both wired and wireless communication capabilities.

Although switch 93 is shown mounted to handlebar assembly 36, it should be appreciated that switch 93 could be mounted in a different location on the vehicle, on a mount coupled to the vehicle, or the like. in one embodiment, the location of switch 93 is modifiable and is located on the vehicle based on a rider's preference.

Figure 2:
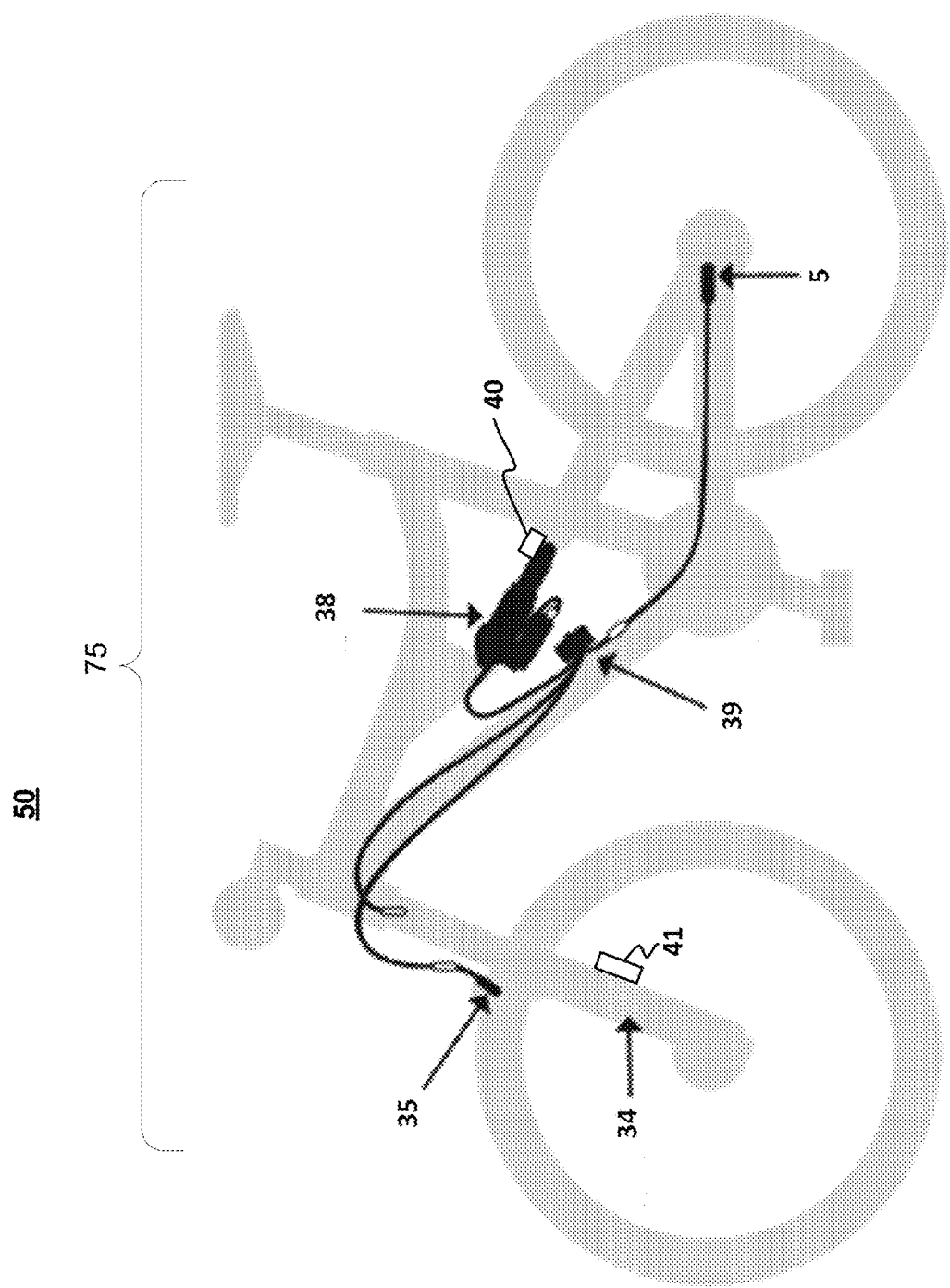
FIG. 2 is a line diagram side view of an electronically adjustable suspension system on the bicycle of FIG. 1, in accordance with an embodiment.

Referring now to FIG. 2, a line drawing of a side view of an electronically adjustable suspension system 75 on bicycle 50 is shown in accordance with one embodiment. In one embodiment, electronically adjustable suspension system 75 includes a number of components such as, but not limited to, one or more sensors, active valve shock assemblies, switches, controller(s), and computer systems.

In one embodiment, the one or more sensors (such as sensors 5, 35, 40, 41, 200, and the like) provide the obtained sensor data to suspension controller 39 which uses the sensor data to monitor the terrain and make suspension adjustments (to an electronic valve(s) in shock assembly 38, a shock assembly in front fork 34, and/or any other active suspension components of the vehicle). In one embodiment, electronically adjustable suspension system 75 is equipped with pitch detection, that can recognize when bicycle 50 is climbing, traversing or descending. In one embodiment, controller 39 includes a lithium ion battery as the main user interface and can be charged (e.g., via micro USB) on or off the bicycle 50.

In one embodiment, suspension controller 39 monitors the terrain at a rate of a thousand times per second and make suspension adjustments in a matter of milliseconds. For example, in one embodiment, sensors on the fork, rear axle, and/or main frame read bump input at the wheel and the pitch angle of the bicycle 50, and send the obtained sensor data to the suspension controller 39 at a rate, such as but not limited to, 1,000 times per second. Thus, by placing sensors on the frame and/or proximate both wheels, the suspension controller 39 processes data from the terrain to constantly adjust the suspension for maximum efficiency and control. In one embodiment, suspension controller 39 includes a lithium ion battery as the main user interface and can be charged (e.g., via micro USB) on or off the bicycle 50.

In general, one or more sensors are used for sensing characteristics (or changes to characteristics) such as terrain, environment, temperature, vehicle speed, vehicle pitch, vehicle roll, vehicle yaw, component activity, or the like. It is understood that the one or more sensors may be imbedded, moved, mounted, or the like, in any suitable configuration and allowing for any suitable range of adjustment as may be desirable.

The one or more sensors may be any suitable force or acceleration transducer (e.g. strain gage, wheatstone bridge, accelerometer, hydraulic, interferometer based, optical, thermal, infrared emitter and receiver, time of flight sensor, LiDar based measurement, hall effect sensor, or any suitable combination thereof). The sensors may utilize solid state electronics, electro-mechanical principles or MEMS, or any other suitable mechanisms. In one embodiment, the sensor is a single axis self-powered accelerometer, such as for example ENDEVCO® model 2229C. In one embodiment, the sensor is a single axis accelerometer such as an ENDEVCO® 12M1A, which is of the surface-mount type. In one embodiment, the sensor may be a triaxial accelerometer such as the ENDEVCO® 67-100.

In one embodiment, sensor 40, sensor 41, and/or any/all of the recited sensors, is a measurement type sensor such as an infrared based time of flight sensor, radar, 2D and 3D imagers, ultrasonic sensor, photoelectric sensors, LiDar, a hall effect sensor, and the like. In one embodiment, the time of flight sensor is a STMicroelectronics sensor model VL53L0X. Although another embodiment would utilize a different sensor type. In one embodiment, the hall effect sensor is an Allegro Micro Systems sensor model A1454. Although another embodiment would utilize a different sensor type.

One or more sensors may be attached to the swing arm 26 directly, to any link thereof, to an intermediate mounting member, to front fork 34, or to any other portion or portions of the bicycle 50 as may be useful. In one embodiment, one or more sensors could be fixed to an unsprung portion of the bicycle 50, such as for example the swing arm assembly 10. In one embodiment, one or more sensors are fixed to a sprung portion of the bicycle 50, such as the frame 24.

In general, one or more sensors may be integrated with the vehicle structure and data processing system as described in U.S. Pat. Nos. 6,863,291; 4,773,671; 4,984,819; 5,390,949; 5,105,918; 6,427,812; 6,244,398; 5,027,303 and 6,935,157; each of which is herein incorporated, in its entirety, by reference. Further, sensors and valves, or principles, of patents and other documents incorporated herein by reference, may be integrated one or more embodiments hereof, individually or in combination, as disclosed herein.

In one embodiment, a mobile device 200 is coupled with handlebar assembly 36. In one embodiment, the mobile device 200 is the only sensor on the bicycle 50. In one embodiment, bicycle 50 sensors includes a mobile device 200 and one or more of sensors 5, 35, 40, 41, etc. Although mobile device 200 is shown mounted to handlebar assembly 36, it should be appreciated that the mobile device 200 could be mounted in a different location on bicycle 50, carried in a rider's backpack, pocket, or the like, stored in another location on the bike (e.g., under the seat pouch, etc.), or the like, and still provide the sensor input information.

Figure 3:
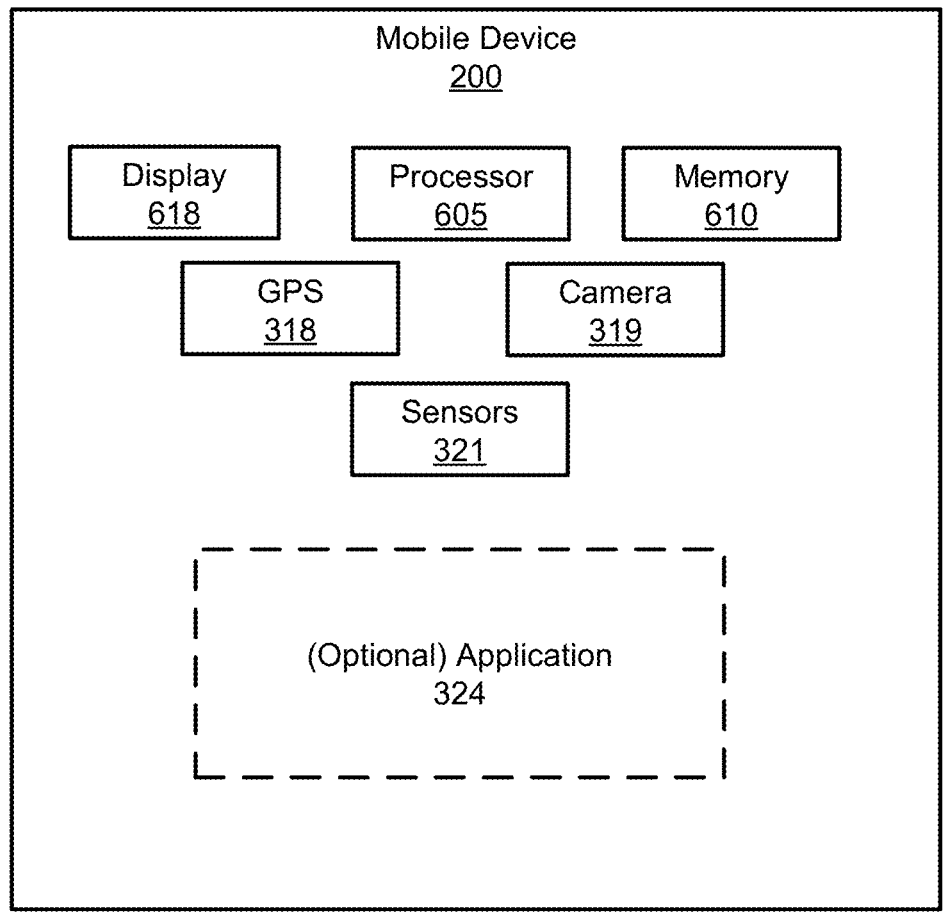
FIG. 3 is a block diagram of an exemplary number of components of a mobile device, in accordance with an embodiment.

Referring now to FIG. 3, a block diagram of a mobile device 200 is shown. Although a number of components are shown as part of mobile device 200, it should be appreciated that other, different, more, or fewer components may be found on mobile device 200.

In general, mobile device 200 is an example of a smart device. Mobile device 200 could be a mobile phone, a smart phone, a tablet, a smart watch, a piece of smart jewelry, smart glasses, or other user portable devices having wireless connectivity. In one embodiment, mobile device 200 is capable of broadcasting and receiving via at least one network, such as, but not limited to, WiFi, Cellular, Bluetooth, near field communication (NFC), and the like. In one embodiment, mobile device 200 includes a display 618, a processor 605, a memory 610, a GPS 318, a camera 319, and the like. In one embodiment, location information can be provided by GPS 318. In one embodiment, the location information could be determined (or enhanced) by the broadcast range of an identified beacon, a WiFi hotspot, overlapped area covered by a plurality of mobile telephone signal providers, or the like. In one embodiment, instead of using GPS information, the location of mobile device 200 may be determined within a given radius, such as the broadcast range of an identified beacon, a WiFi hotspot, overlapped area covered by a plurality of mobile telephone signal providers, or the like. In one embodiment, geofences are used to define a given area and an alert or other indication is made when the mobile device 200 enters into or departs from a geofence.

Mobile device 200 includes sensors 321 which can include one or more of audio, visual, motion, acceleration, altitude, GPS, and the like. In one embodiment, mobile device 200 includes an optional application 324 which operates thereon. In general, optional application 324 allow users to set and/or swap tunes conveniently and quickly via their mobile device. for example, when a tune is selected for activation, the selection is transmitted via Bluetooth (or other near field communication (NFC) protocols) to the controller 39 and/or directly to the suspension component for implementation.

In one embodiment, the optional application is the FOX™ connected component platform. Additional information regarding the connected component platform is found in U.S. Pat. No. 11,459,050 the content of which is incorporated by reference herein, in its entirety.

Referring again to FIGS. 1 and 2, in one embodiment, one or a plurality of component(s) of the bicycle 50 are also connected component(s). Examples of the connected component(s) can include one or more of the forks, wheels, rear shocks, front shocks, handlebars, seat posts, pedals, cranks, and the like. In one embodiment, the connected component(s) will include connective features that allow them to communicate wired or wirelessly with controller 39, mobile device 200, one or more sensors, and/or any other connected component(s) within transmission range. In one embodiment, the sensors, smart devices, controllers, valves, and the like may be interconnected or connected by (one or a combination of) wire, or wirelessly via systems such as near field communication (NFC), WAN, LAN, Bluetooth, WiFi, ANT, GARMIN® low power usage protocol, or any suitable power or signal transmitting mechanism, making them connected components.

By using a connected component, data (including real-time data) can be collected from the connected component. Depending upon the connected component, data such as telemetry attributes to provide angle, orientation, velocity, acceleration, RPM, operating temperature, and the like, can be obtained. Moreover, general use data about the connected component can also be obtained.

An example of a connected component of type wheel would be a sensor that monitors a wheel (or wheels) to provide telemetry such as RPM, tire pressure, tire temperature, or the like. For example, the connected component could be a smart valve stem, a MEMS device, or the like coupled with the rim of the wheel, etc.

An example of a connected component of type handlebar would be a connected component that provides handlebar geometry information, handlebar dimensions, stress measurements, or the like. For example, the connected component could be a MEMS device coupled with the handlebar.

An example of a connected component of type seat post would be connected component that provides geometry information such as seat height, seat pitch, roll, yaw, seat forward or aft location, weight on the seat, or the like. For example, the connected component could be a MEMS device coupled with the seat post.

An example of a connected component of type pedal would be connected component that provides telemetry such as RPM's, push and pull pressure, left side versus right side performance data (e.g., a stronger force on the right pedal or left pedal, in the up or down direction), or the like. For example, the connected component could be a MEMS device or other sensor type coupled with the pedal(s).

An example of a connected component of type crank set would be connected component that provides telemetry such as RPM's, chain tension, chain temperature, internal crank temperature, bearing operation, or the like. For example, the connected component could be a MEMS device coupled with the crank set.

Figure 4:
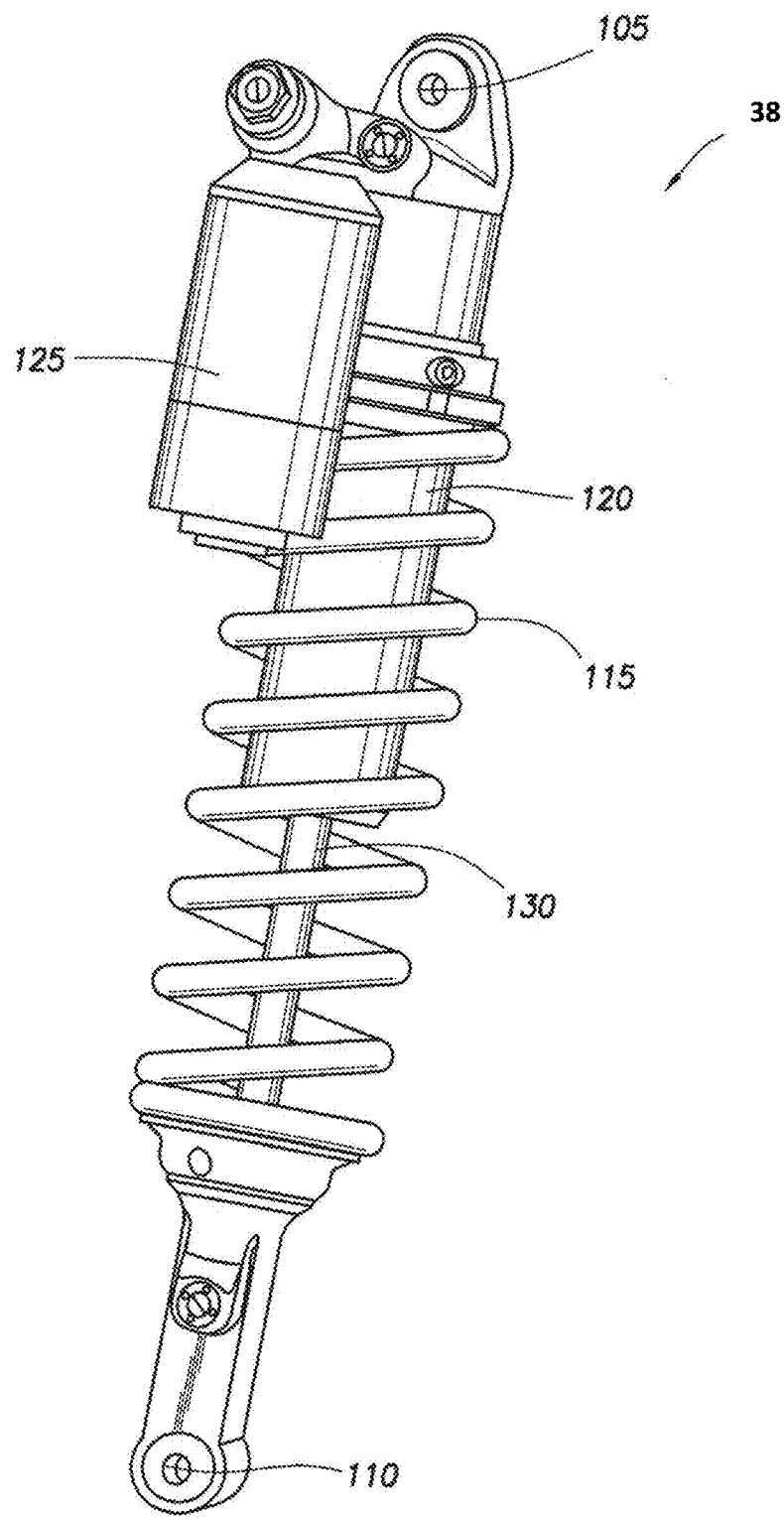
FIG. 4 is a perspective view of shock assembly with electronic damping control, in accordance with an embodiment.

FIG. 4 is a perspective view of shock assembly 38 with electronic damping control in accordance with an embodiment. In one embodiment, shock assembly 38 includes eyelets 105 and 110, housing 120, helical spring 115, piston shaft 130, and piggyback (or external reservoir 125). In one embodiment, external reservoir 125 is described in U.S. Pat. No. 7,374,028 the content of which is entirely incorporated herein by reference.

In one embodiment, the housing 120 includes a piston and chamber and the external reservoir 125 includes a floating piston and pressurized gas to compensate for a reduction in volume in the main damper chamber of the shock assembly 38 as the piston shaft 130 moves into the damper body. Fluid communication between the main chamber of the damper and the external reservoir 125 may be via a flow channel including an adjustable needle valve. In its basic form, the damper works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Although a coil sprung shock assembly is shown in FIG. 4, this is provided as one embodiment and for purposes of clarity. In one embodiment, shock assembly 38 could be a different type such as, but not limited to, an air sprung shock assembly, a stand-alone shock assembly, and the like.

In general, shock assembly 38 includes at least one electronically controllable valve which result in a shock assembly with an adjustably controllable damping rate. The active valve could be wired or wirelessly controlled by controller 39, on board electronics, mobile device 200, etc.

Additional information for vehicle suspension systems, sensors, active and semi-active valves, including those used for compression and/or rebound stiffness adjustments, preload adjustments, bottom-out control, preload adjustment, ride height adjustment, and the like is provided in U.S. Pat. Nos. 8,838,335; 9,353,818; 9,623,716; 9,682,604; 9,797,467; 10,036,443; and 10,415,662; the content of which are incorporated by reference herein, in their entirety.

Figure 5:
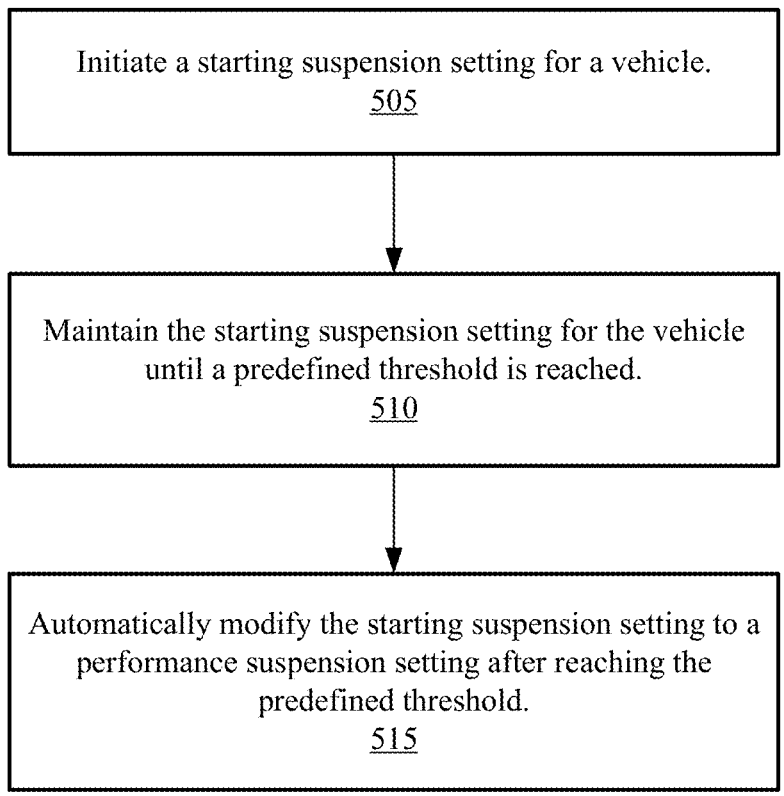
FIG. 5 is a flow diagram of a method for implementing a hot-start suspension tune, in accordance with an embodiment.

Referring now to FIG. 5, a flow diagram of a method for implementing a hot-start is shown in accordance with an embodiment. As discussed herein, hot-start places the bike in the most appropriate suspension setting for the start of the race. After the starting section is completed, the hot-start will automatically transition the vehicle from the selected starting suspension setting to a performance suspension setting.

With reference now to 505 of FIG. 5, one embodiment initiates a starting suspension setting for a vehicle. In one embodiment, the starting suspension setting is for one or more shock assemblies of the vehicle.

Often, the preferred starting suspension settings are not the same as the preferred suspension settings for the rest of the event. For example, at the start of an event the rider will start from a standstill (or rolling start) and will generate an initial burst of acceleration for the first few meters. In other words, the rider will basically be the dominant force in the rider-vehicle equation. However, after the initial burst of acceleration, there will be a transition to the event performance portion. At that point, the rider-vehicle equation will change to a symbiotic relationship as the rider works in conjunction with the vehicle suspension to achieve the best performance.

In addition, the first few meters of an event are often formatted as a starting section and will include technically simple features such as a starting gate, platform, slope, and/or an initial straightaway. This starting section will allow the rider to focus on attaining the needed acceleration with minimal outside interference. In most cases, the vehicle would have the starting suspension set to a firmer state (e.g., locked out, fully firm, firmer, etc.) than the performance suspension state. This will ensure the suspension absorbs the least amount of rider input energy (e.g., due to pedal bob, flex, etc.) during the start.

After completing the starting section, the vehicle will enter the performance aspects of the event which will quickly transition from a pure acceleration mode to a performance mode. Thus, after the start, the vehicle will often perform better when the suspension is returned to its desired performance settings (e.g., usually not a fully firm or locked out setting).

Of course, there can be some situations where the ideal start suspension would be softer than the desired performance settings. Hot-start also works for these scenarios.

In a very simple example of operation, the hot-start will define a starting suspension setting (or tune, mode, etc.) and a performance setting (or tune, mode, etc.). For purposes of the discussion, the performance setting refers to suspension settings (or tune) based on the event, the vehicle, the desired performance, etc. In one embodiment, the performance setting is the normal operating mode of the vehicle.

In contrast, the starting suspension settings (or tune) is different than the performance settings and is often a firmest or locked out setting. In other words, the starting suspension setting is a firmer setting than the performance suspension setting.

Referring now to 510 of FIG. 5, one embodiment maintains the starting suspension setting for a predefined threshold.

For example, in a static start scenario, the vehicle will initially accelerate out of a starting gate or from a starting line. Often, the sprint is performed over a given starting distance after which the vehicle will be up to speed and/or reach a technical feature such as a jump, corner, rock garden, etc. In the case of a bicycle, the rider will be focused on pedaling as hard as possible through the initial sprint after which they will transition from the focus on pedaling to a focus on transitioning the course.

That is, the initial sprint can be defined as an overall starting distance, e.g., the distance from the starting line until the vehicle is up to speed and/or arrives at the first technical feature. Similarly, the initial sprint can be defined as an overall time period, e.g., the time it takes for the vehicle to cover the overall starting distance. Of course, the initial sprint can also be defined by the location where the vehicle is up to speed and/or reaches the technical feature.

Therefore, in different embodiments, the predefined threshold can be one or a combination of two or more of an amount of time, a distance, a number of revolutions of a wheel, a speed, a wheel RPM, a location (e.g., entered/reached/departed) or the like.

In many cases, the rider will have the opportunity for one or more practice starts before the actual event. As such, the rider would be able to experimentally determine the time, distance, speed, location, etc. they want the suspension to be in the starting configuration.

In a predefined time period scenario, the starting configuration time period is determined. The time period is input into the hot-start (application, controller, etc.) and may optionally include an amount of time added to account for the time between the hot-start initiation and the launch. When the rider is in the starting location, they will initiate the hot-start prior to the start. In one embodiment, the rider will manipulate a user input feature such as switch 93, mobile device 200, or the like to initiate the hot-start timer and begin the tolling of the predefined time period.

In one embodiment, the user input feature would include a reset action (such as multiple inputs) to reset the hot-start timer. For example, if the user accidentally initiated the hot-start, was delayed in starting after initiating the hot-start, or the like.

In one embodiment, such as a predefined distance scenario, the overall starting distance is determined. In one embodiment, the predefined threshold is a distance based on a number of revolutions of a wheel. Once determined, the distance value is input into the hot-start (application, controller, etc.) and may optionally include an amount added to account for moving into the starting position after the hot-start is initiated and prior to the launch. When the rider is ready, they will initiate the hot-start. In one embodiment, the rider will manipulate a user input feature such as switch 93, mobile device 200, or the like to initiate the hot-start. After initiation, the hot-start will begin tolling until the predefined distance has been achieved.

In one embodiment, such as a predefined threshold speed scenario, the desired "up-to-speed" speed is determined. In one embodiment, the predefined threshold speed is based on a wheel RPM value or the like. Once determined, the predefined speed is input into the hot-start (application, controller, etc.). When the rider is ready, they will initiate the hot-start. In one embodiment, the rider will manipulate a user input feature such as switch 93, mobile device 200, or the like to initiate the hot-start. After initiation, the hot-start will begin monitoring until the predefined speed is achieved.

In one embodiment, such as a predefined location scenario, the desired transition location is determined. The predefined location is input into the hot-start (application, controller, etc.). When the rider is ready, they will initiate the hot-start. In one embodiment, the rider will manipulate a user input feature such as switch 93, mobile device 200, or the like to initiate the hot-start. After initiation, the hot-start keep the suspension in the starting configuration until the predefined location is entered, reached, or departed. In one embodiment, the location is a geofence.

For example, in one embodiment, the hot-start application will use GPS location information (e.g., periodically check the GPS location, provide a location to the GPS, that when reached will cause the GPS to send an alert, etc.) to determine when the vehicle has reached the predefined location.

In another embodiment, instead of the user manipulating something to initiate the hot-start tolling of the predefined time, distance, or the like, the hot-start will be armed but the timing and/or distance measurements will be initiated by a different input and/or a plurality of inputs.

For example, after a predefined acceleration value is detected, such as by an accelerometer or the like. For example, although the hot-start is armed (or ready to act), the measurement will only start to toll after a forward acceleration of a pre-set magnitude is recognized. For example, the pre-set magnitude would be greater than a push or rolling forward of the vehicle within the starting gate, and properly associated with the magnitude below that obtained by the rider pedaling out of the starting gate.

In one embodiment, instead of starting to toll the distance or time, the hot-start would keep the suspension in the starting configuration until the acceleration moves above the magnitude indicative of the rider pedaling out of the starting gate and then recedes below a magnitude indicative of the vehicle being up to speed.

Similarly, in another embodiment, the timing and/or distance measurements of the hot-start will be initiated after a predefined force is detected by a pedal sensor or the like. For example, although the hot-start is armed (or ready to act), the measurement will only start to toll after a pedal force of a pre-set magnitude is recognized. For example, the pre-set magnitude would be a magnitude below that obtained by the rider pedaling out of the starting gate.

In one embodiment, instead of starting to toll the distance or time, the hot-start would keep the suspension in the starting configuration until the pedal force moves above the magnitude obtained by the rider pedaling out of the starting gate and then recedes below a magnitude indicative of the rider stopping or reducing their pedaling.

In different embodiments other sensor inputs are used by the hot-start to determine whether or not to keep the suspension in the starting configuration. Those other sensor inputs include handlebar sensors to monitor grip, saddle and/or seatpost sensors to determine when the rider sits after the start, turn sensors to determine a vehicle turning and/or tilting to indicate a sharp turn as the end of the starting section, pitch sensors to determine a hard breaking indicative of the end of the starting section, and the like.

With reference now to 515 of FIG. 5, one embodiment automatically modifies the starting suspension setting to a performance suspension setting for the shock assembly after an expiration of the predefined threshold.

In one embodiment, an electronic valve of the shock assembly is used to automatically modify at least one suspension characteristic of the shock assembly from the starting configuration to the performance configuration.

By utilizing the hot-start modality, the vehicle can use a starting suspension tune (such as having the suspension in the firm setting) and have the suspension be automatically switched to a performance setting (e.g., a softer setting, normal suspension operation settings, etc.) at the desired point in the run. By utilizing the automatic switching, the user will be able to concentrate on racing and not worry about forget to manually switch (or otherwise provide an input to switch) the suspension from the starting tune to the performance tune.

Figure 6:
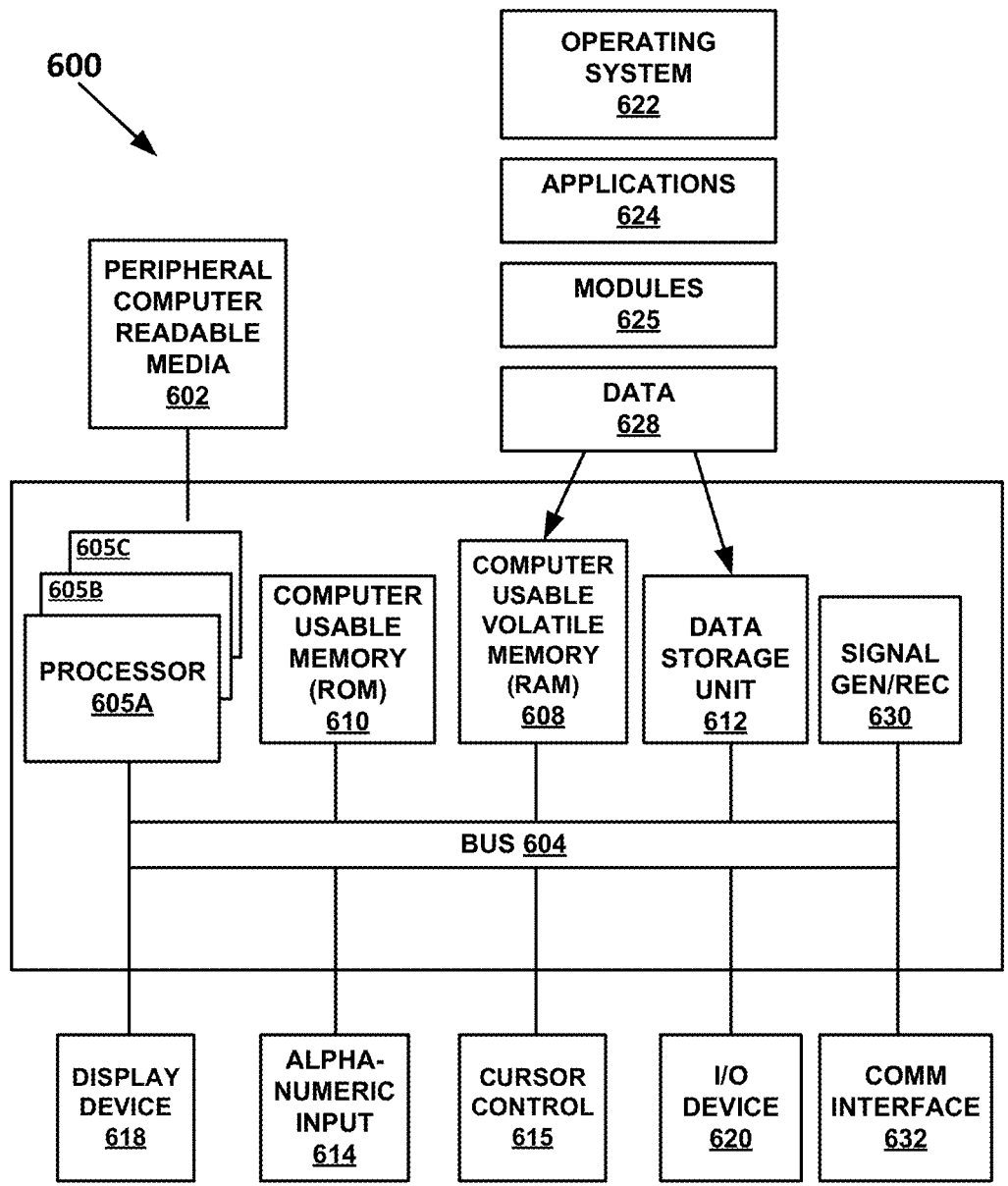
FIG. 6 is a block diagram of an example computer system with which or upon which various embodiments of the present invention may be implemented.

With reference now to FIG. 6, an example computer system 600 is shown. In the following discussion, computer system 600 is representative of a system or components that may be used with aspects of the present technology. In one embodiment, different computing environments will only use some of the components shown in computer system 600.

In general, one or more of the components of electronically adjustable suspension system 75 will include some or all of the components of computer system 600. In different embodiments, one or more of the components of electronically adjustable suspension system 75 include communication capabilities (e.g., wired such as ports or the like, and/or wirelessly such as near field communication, Bluetooth, WiFi, or the like) such that some of the components of computer system 600 are found on specific components (such as controller 39, mobile device 200, etc.) while other components could be ancillary but communicatively coupled thereto (such as a mobile device, tablet, computer system or the like). For example, in one embodiment, suspension controller 39 can be communicatively coupled to one or more different computing systems to allow a user (or manufacturer, tuner, technician, etc.) to adjust or modify any or all of the programming stored in suspension controller 39. In one embodiment, the programming includes computer-readable and computer-executable instructions that reside, for example, in non-transitory computer-readable medium (or storage media, etc.) of suspension controller 39 and/or computer system 600.

In one embodiment, computer system 600 includes an address/data/service bus 604 for communicating information, and a processor 605A coupled to bus 604 for processing information and instructions. As depicted in FIG. 6, computer system 600 is also well suited to a multi-processor environment in which a plurality of processors 605A, 605B, and 605C are present. Conversely, computer system 600 is also well suited to having a single processor such as, for example, processor 605A. Processors 605A, 605B, and 605C may be any of various types of microprocessors. Computer system 600 also includes data storage features such as a computer usable volatile memory 608, e.g., random access memory (RAM), coupled to bus 604 for storing information and instructions for processors 605A, 605B, and 605C.

Computer system 600 also includes computer usable non-volatile memory 610, e.g., read only memory (ROM), coupled to bus 604 for storing static information and instructions for processors 605A, 605B, and 605C. Also present in computer system 600 is a data storage unit 612 (e.g., a magnetic disk drive, optical disk drive, solid state drive (SSD), and the like) coupled to bus 604 for storing information and instructions. Computer system 600 also can optionally include an alpha-numeric input device 614 including alphanumeric and function keys coupled to bus 604 for communicating information and command selections to processor 605A or processors 605A, 605B, and 605C. Computer system 600 also can optionally include a cursor control device 615 coupled to bus 604 for communicating user input information and command selections to processor 605A or processors 605A, 605B, and 605C. Cursor control device may be a touch sensor, gesture recognition device, and the like. Computer system 600 of the present embodiment can optionally include a display device 618 coupled to bus 604 for displaying information.

Referring still to FIG. 6, display device 618 can be a liquid crystal device, cathode ray tube, OLED, plasma display device or other display device suitable for creating graphic images and alpha-numeric characters recognizable to a user. Cursor control device 615 allows the computer user to dynamically signal the movement of a visible symbol (cursor) on a display screen of display device 618. Many implementations of cursor control device 615 are known in the art including a trackball, mouse, touch pad, joystick, non-contact input, gesture recognition, voice commands, bio recognition, and the like. In addition, special keys on alpha-numeric input device 614 capable of signaling movement of a given direction or manner of displacement. Alternatively, it will be appreciated that a cursor can be directed and/or activated via input from alpha-numeric input device 614 using special keys and key sequence commands.

Computer system 600 is also well suited to having a cursor directed by other means such as, for example, voice commands. Computer system 600 also includes an I/O device 620 for coupling computer system 600 with external entities. For example, in one embodiment, I/O device 620 is a modem for enabling wired or wireless communications between computer system 600 and an external network such as, but not limited to, the Internet or intranet. A more detailed discussion of the present technology is found below.

Referring still to FIG. 6, various other components are depicted for computer system 600. Specifically, when present, an operating system 622, applications 624, modules 625, and data 628 are shown as typically residing in one or some combination of computer usable volatile memory 608, e.g. random-access memory (RAM), and data storage unit 612. However, it is appreciated that in some embodiments, operating system 622 may be stored in other locations such as on a network or on a flash drive; and that further, operating system 622 may be accessed from a remote location via, for example, a coupling to the Internet. The present technology may be applied to one or more elements of described computer system 600.

Computer system 600 also includes one or more signal generating and receiving device(s) 630 coupled with bus 604 for enabling computer system 600 to interface with other electronic devices and computer systems. Signal generating and receiving device(s) 630 of the present embodiment may include wired serial adaptors, modems, and network adaptors, wireless modems, and wireless network adaptors, and other such communication technology. The signal generating and receiving device(s) 630 may work in conjunction with one (or more) communication interface 632 for coupling information to and/or from computer system 600. Communication interface 632 may include a serial port, parallel port, Universal Serial Bus (USB), Ethernet port, Bluetooth, thunderbolt, near field communications port, WiFi, Cellular modem, or other input/output interface. Communication interface 632 may physically, electrically, optically, or wirelessly (e.g., via radio frequency) couple computer system 600 with another device, such as a mobile phone, radio, or computer system.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

We claim:

1. A hot-start method comprising:
   initiating a starting suspension setting for a vehicle;
   maintaining said starting suspension setting for said vehicle until a predefined threshold is reached; and
   automatically modifying said starting suspension setting to a performance suspension setting after reaching said predefined threshold.

2. The method of claim 1, wherein said starting suspension setting is a firmer setting than said performance suspension setting.

3. The method of claim 1, further comprising:
   utilizing an electronic valve of a shock assembly to automatically modify at least one suspension characteristic of said shock assembly.

4. The method of claim 1, wherein said predefined threshold is a predefined time period, and said method further comprises:
   initiating said predefined time period after a user input feature is manipulated.

5. The method of claim 1, wherein said predefined threshold is a predefined time period, and said method further comprises:
   initiating said predefined time period after a predefined acceleration value is detected by an accelerometer.

6. The method of claim 1, wherein said predefined threshold is a predefined time period, and said method further comprises:
   initiating said predefined time period after a predefined force is detected by a pedal sensor.

7. The method of claim 1, wherein said predefined threshold is a predefined time period, and said method further comprises:
   initiating said predefined time period after a location relative to a predefined location is determined, wherein said location relative to said predefined location is selected from a group consisting of: moving into said predefined location, moving out of said predefined location, and moving through said predefined location.

8. The method of claim 1, wherein said predefined threshold is a speed.

9. The method of claim 1, wherein said predefined threshold is a distance.

10. A non-transitory computer-readable medium for storing instructions, said instructions comprising:
one or more instructions which, when executed by one or more processors, cause one or more processors to:
initiate a starting suspension tune for a shock assembly;
maintain said starting suspension tune for said shock assembly for a predefined time period; and
automatically modify said starting suspension tune to a performance suspension tune after an expiration of said predefined time period.

11. The non-transitory computer-readable medium of claim 10, wherein said starting suspension tune is firmer than said performance suspension tune.

12. The non-transitory computer-readable medium of claim 10, wherein said one or more processors are further configured to:
utilize an electronic valve of said shock assembly to automatically modify at least one suspension setting of said shock assembly.

13. The non-transitory computer-readable medium of claim 10, wherein said one or more processors are further configured to:
initiate said predefined time period after a user input feature is manipulated.

14. The non-transitory computer-readable medium of claim 10, wherein said one or more processors are further configured to:
initiate said predefined time period after a predefined acceleration value is detected by an accelerometer.

15. The non-transitory computer-readable medium of claim 10, wherein said one or more processors are further configured to:
initiate said predefined time period after a predefined force is detected by a pedal sensor.

16. The non-transitory computer-readable medium of claim 10, wherein said one or more processors are further configured to:
initiate said predefined time period after a location relative to a predefined location is determined, wherein said location relative to said predefined location is selected from a group consisting of: moving into said predefined location, moving out of said predefined location, and moving through said predefined location.

17. A hot-start system comprising:
at least one shock assembly comprising an electronic valve, said at least one shock assembly being part of a vehicle suspension;
a starting mode initiator configured to set said at least one shock assembly to a starting tune;
an input receiver configured to receive an input and initiate a timer; and
a controller in communication with said electronic valve of said at least one shock assembly, said controller to:
receive an indication that said timer has tolled; and
communicate an adjustment command to said electronic valve to change said at least one shock assembly to a different mode.

18. The hot-start system of claim 17, wherein said input receiver is a user manipulatable feature and said timer is initiated after said input receiver is manipulated.

19. The hot-start system of claim 17, wherein said input receiver is a sensor and said timer is initiated after a predefined threshold value is detected by said sensor.

20. The hot-start system of claim 17, wherein said input receiver is a location sensor and said timer is initiated after a location relative to a predefined location is determined, wherein said location relative to said predefined location is selected from a group consisting of: moving into said predefined location, moving out of said predefined location, and moving through said predefined location.

* * * * *